United States Patent
Boiocchi et al.

(10) Patent No.: US 7,100,654 B2
(45) Date of Patent: Sep. 5, 2006

(54) SAFETY SUPPORT FOR A VEHICLE WHEEL AND SAFETY SYSTEM AND VEHICLE WHEEL INCLUDING THE SAFETY SUPPORT

(75) Inventors: Maurizio Boiocchi, Segrate (IT); Daniele Lorenzetti, Milan (IT); Mario Secchi, Milan (IT)

(73) Assignee: Pirelli Pneumatici S.p.A., Milan (IT)

(*) Notice: Subject to any disclaimer, the term of this patent is extended or adjusted under 35 U.S.C. 154(b) by 0 days.

(21) Appl. No.: 10/475,127

(22) PCT Filed: Apr. 18, 2002

(86) PCT No.: PCT/EP02/04289

§ 371 (c)(1),
(2), (4) Date: May 10, 2004

(87) PCT Pub. No.: WO02/087903

PCT Pub. Date: Nov. 7, 2002

(65) Prior Publication Data

US 2004/0173298 A1    Sep. 9, 2004

Related U.S. Application Data

(60) Provisional application No. 60/299,447, filed on Jun. 21, 2001.

(30) Foreign Application Priority Data

Apr. 30, 2001    (EP) .................................. 01830285

(51) Int. Cl.
*B60C 17/04* (2006.01)
*B60C 5/00* (2006.01)
*B60B 21/02* (2006.01)

(52) U.S. Cl. .................... 152/520; 152/381.6; 152/158

(58) Field of Classification Search ................ 152/516, 152/520, 379.4, 379.5, 381.4, 381.5, 381.6, 152/400; 301/6.91
See application file for complete search history.

(56) References Cited

U.S. PATENT DOCUMENTS 1,686,977 A * 10/1928 Littman ................... 152/340.1

(Continued)

FOREIGN PATENT DOCUMENTS

DE    19640039 A1    4/1998

(Continued)

OTHER PUBLICATIONS

Koichi, I. "Run Flat Pneumatic Tire", Patent Abstracts of Japan, JP06183226, (Jul. 5, 1994).

*Primary Examiner*—Jason R. Bellinger
(74) *Attorney, Agent, or Firm*—Finnegan, Henderson, Farabow, Garrett & Dunner, L.L.P.

(57) ABSTRACT

A safety support for mounting on a rim of a vehicle wheel within a tire includes a substantially toroidal hollow annular body and a filling of elastically deformable expanded material. The annular body includes a convex radially outer surface, two axially opposite side surfaces, and devices for associating the annular body to the rim. The annular body is made of a rigid and substantially non-extensible material and is elastically deformable under load for absorbing stresses imparted to the tire in case of pressure loss by the tire. Each side surface is connected to the radially outer surface by respective first axially opposite connecting portions. A safety system for the vehicle wheel includes a tire and the safety support. The vehicle wheel includes the tire, the safety support, and the rim.

40 Claims, 3 Drawing Sheets

U.S. PATENT DOCUMENTS

| | | | | |
|---|---|---|---|---|
| 1,889,799 A | * | 12/1932 | Clark | 152/508 |
| 2,012,838 A | * | 8/1935 | Tilden | 188/218 A |
| 4,121,640 A | * | 10/1978 | Henning et al. | 152/340.1 |
| 4,263,953 A | * | 4/1981 | Miceli | 152/158 |
| 4,334,565 A | * | 6/1982 | Stokes | 152/158 |
| 4,418,734 A | * | 12/1983 | Dobson | 152/158 |
| 4,722,377 A | * | 2/1988 | Dobson | 152/158 |
| 4,751,951 A | | 6/1988 | Dobson | |
| 4,896,921 A | * | 1/1990 | Sato et al. | 301/5.1 |
| 4,922,981 A | | 5/1990 | Pompier | |
| 5,176,764 A | | 1/1993 | Abbott et al. | |
| 5,690,762 A | * | 11/1997 | Bock et al. | 152/520 |
| 5,836,366 A | * | 11/1998 | Muhlhoff | 152/379.3 |
| 5,885,383 A | * | 3/1999 | French | 152/158 |
| 6,390,563 B1 | * | 5/2002 | Haverkamp et al. | 301/6.91 |
| 6,415,839 B1 | * | 7/2002 | Pompier et al. | 152/381.4 |
| 6,598,633 B1 | * | 7/2003 | Pompier et al. | 152/158 |
| 2001/0015249 A1 | * | 8/2001 | Mohr | 152/381.6 |

FOREIGN PATENT DOCUMENTS

EP     0 796 747 A1     9/1997

\* cited by examiner

SAFETY SUPPORT FOR A VEHICLE WHEEL AND SAFETY SYSTEM AND VEHICLE WHEEL INCLUDING THE SAFETY SUPPORT

CROSS-REFERENCE TO RELATED APPLICATIONS

This application is a national-phase entry under 35 U.S.C. § 371 from International Application No. PCT/EP02/04289, filed Apr. 18, 2002, in the European Patent Office, the contents of which are relied upon and incorporated herein by reference; additionally, Applicants claim the right of priority under 35 U.S.C. § 119(a)–(d) based on patent application No. 01830285.1, filed Apr. 30, 2001, in the European Patent Office; further, Applicants claim the benefit under 35 U.S.C. § 119(e) based on provisional application No. 60/299,447, filed Jun. 21, 2001, in the U.S. Patent and Trademark Office.

BACKGROUND OF THE INVENTION

1. Field of the Invention

In a first aspect thereof, the present invention relates to a safety support intended for being mounted on a rim of a vehicle wheel within a tire, for supporting said tire in case of pressure loss.

The present invention also relates to a safety system for vehicle tires comprising the above-mentioned safety support and a tire having a tread, a couple of sidewalls and a couple of beads suitable for being mounted on respective housing seats of a rim.

Lastly, the present invention relates to a vehicle wheel comprising a tire, a rim and the above-mentioned safety support.

2. Description of the Related Art

In the field of the production of vehicle tires the need has always been felt of ensuring a safe running condition for the vehicle also in case a tire of said vehicle loses its pressure.

To this purpose, safety supports have been made intended for being mounted on the rim within the tire, which safety supports support said tire, and particularly the crown portion of the same, should the tire pressure markedly reduce with respect to the tire nominal pressure.

With regard to this, a method for evaluating the compliance of the tire with the above-mentioned safety need may consist, for instance, in testing the tire performance in the so-called "run-flat" conditions. In the present description and in the subsequent claims, the expression "testing the tire performance in run-flat conditions", is used to indicate a test methodology developed by the Applicant, by which a vehicle must run for about 200 km at a speed of 80 km/h, with a load equal to 80% of the maximum load (Load Index) admitted for the tire.

It is particularly difficult to satisfy entirely the above-mentioned safety need without causing a substantial increase in the total weight of the wheel wherein the safety support is inserted, with an ensuing increase in non-suspended masses and a corresponding worsening of the vehicle performance.

A further difficulty is that of providing the safety support with an adequate centrifugation resistance, both in terms of structural integrity of the support also at high speed, and in terms of maintaining a stable contact between the support and the rim, in the so-called normal running conditions, i.e. at the nominal pressure of the tire.

The structural integrity of the safety support may be tested, for example, by rotating the rim-safety support assembly at a rotation speed equivalent to a supposable vehicle running speed in the order of 400 km/h.

A further difficulty in the manufacture of a safety support having a good quality lies in ensuring an adequate contact surface between the tread and the rolling surface when, due to a loss of the tire pressure, the safety support gets in touch with the tire and supports the latter. In other words, the safety support should be capable of deforming so as to adhere as much as possible to the tire.

Until now, the attempts carried out in the art aiming at satisfying the above-mentioned need in all its aspects, i.e. the attempts to achieve an adequate performance in the "run-flat" conditions by means of a safety support which has a limited weight while being resistant to centrifugation and such as to maximize the contact surface between the tread and the rolling surface, have not given a fully satisfactory result, involving a more or less evident worsening of one or more of the characteristics described above.

For instance, patent application EP 0 796 747 discloses a safety support inserted in a tire, made of a soft elastomeric material, said support comprising an annular base reinforced by a circumferential reinforcing layer, an annular top provided in its radially outer wall with longitudinal grooves, and an annular body connecting the base with the top.

In case of loss of the tire pressure, even though the support proposed by patent application EP 0 796 747 allows to obtain both an adequate contact between the support and the crown portion of the tire—thanks to the deformability of the elastomeric material used—and an adequate centrifugation resistance—thanks to the introduction of the circumferential reinforcing layer embedded in the elastomeric material—the manufacture of the support is rather complex and the total weight of the wheel is excessive with respect to the weight of a traditional wheel having no safety support.

U.S. Pat. No. 4,751,951 discloses an annular safety support of elastomeric material in the form of a foam provided with closed cells containing gas under pressure. In order to control the expansion of said safety support and to maintain the same in position between the beads of the tire when the latter is deflated, the safety support is enveloped by a layer of reinforcing cords, fact which requires several cumbersome handling and assembling operations, similar to those required in the manufacture of a tire. Besides, according to what has been said above with reference to patent application EP 0 796 747, the desired maintenance of the support in position, i.e. the maintenance of a stable contact between the support and the rim, is accomplished to the detriment of the wheel weight, which increases too much with respect to the weight of a traditional wheel having no safety support.

SUMMARY OF THE INVENTION

The technical problem underlying the present invention is therefore that of providing a safety support intended for being mounted on a vehicle wheel rim within the tire, for supporting said tire in case of loss of inflation pressure, which support should be capable of satisfying in all its aspects the need of ensuring that the vehicle runs in safe conditions even when the tire is partly or entirely deflated.

In a first aspect thereof, the present invention relates to a safety support according to the preamble of the attached claim 1, characterized in that the safety support comprises a substantially toroidal hollow annular body of a rigid and substantially non-extensible material including a filling of elastically deformable expanded material, said annular body being elastically deformable under a load for absorbing the stresses imparted to the tire in case of pressure loss and including:

a convex radially outer surface;

two axially opposite side surfaces, each of said side surfaces being connected to the radially outer surface of the annular body by means of respective first axially opposite connecting portions; and associating devices for associating said annular body to said rim.

The technical effects advantageously achieved by the invention are that of providing a centrifugation-resistant safety support and such as to maximize the contact surface with the crown portion of the tire, without however involving an excessive increase of the total weight of the wheel, thereby ensuring a "run-flat" condition as defined above.

In the first place, in fact, thanks to the toroidal configuration made of a rigid and substantially non-extensible material, the support of the invention is advantageously circumferentially non-extensible, i.e. capable of ensuring an adequate centrifugation resistance, while also ensuring—thanks to the presence of the associating devices—a stable contact between the rim and the support. Besides, thanks to the substantially convex configuration of the radially outer surface of the above-mentioned annular body, and to the presence of the deformable elastic filling, the support of the invention is advantageously radially elastically deformable, thereby ensuring an adequate contact surface between the support and the crown portion of the tire even in conditions of zero pressure of the tire wherein the support is inserted. In other words, the safety support of the invention allows to accomplish a good balance between two opposite needs, i.e. a sufficient deformability and a high centrifugation resistance also at high running speed, without however increasing the weight of said support to a non acceptable extent.

In the second place, thanks to the use of a hollow annular body including a filling of expanded material, it is advantageously possible to obtain a safety support having a limited weight with respect to the safety supports of the prior art.

In fact, the presence of the filling advantageously limits the deformation of the annular body which envelopes the filling, absorbing a part of the energy imparted to the support during the "run-flat" condition, thereby allowing to adopt an annular body made of a rigid material having a limited thickness, and minimizing the weight of the safety support as a whole.

The overall load which the safety support of the invention can support is advantageously distributed between the annular body made of rigid material and the filling of elastically deformable expanded material. Preferably, the distribution of the load is such that at least 30% of the same is supported by the annular body made of rigid material: to this aim, the yield strength of the rigid material should not be smaller than about 400 N/mm$^2$. Preferably, the distribution of the load is such that at most 70% of the same is supported by the annular body made of rigid material: to this aim, the yield strength of the rigid material should not be greater than about 1200 N/mm$^2$.

At such two preferred boundary values of the load distribution, the filling of elastically deformable expanded material has a compression strength preferably equal to at least 30 MPa and, respectively, preferably at most equal to about 15 MPa.

Preferably, the distribution of the load is such that 40% of the same is supported by the annular body made of rigid material and, even more preferably, such that 50% of the same is supported by the annular body made of rigid material.

Obviously, the man skilled in art will know how to operate within said range of preferred values (30%–70%) of the load which the annular body made of rigid material can support depending on the materials available to him.

In this way, the opposite needs of high centrifugation resistance and sufficient deformability can be advantageously balanced, while limiting the weight of the safety support of the invention.

Besides, by suitably sizing the safety support of the invention, it is possible to associate the latter to different types of rims which are employed nowadays, such as for instance the two-piece rims, those having a detachable rim flange, those having different fitting diameters between the two bead seats, and those so called PAX® (trademark registered by Michelin) having different fitting diameters, which are conformed as to prevent the beads from unwedging in case of loss of inflation pressure. If the rim is not of the PAX® type, the safety support should be sized so as to maintain the tire beads against the rim flanges in case of loss of pressure of said tire.

According to a first embodiment, the side surfaces of the hollow annular body of the invention are placed in direct touch with the radially outer surface of the rim. In this case, the associating devices of said support comprise blocking devices adapted to fix said support to the rim, wherein said blocking devices may be, for example, a plurality of spring retaining members circumferentially distributed along said support, and adapted to be inserted in respective blocking seats obtained on the rim. Preferably, said spring retaining members are integrally formed with the side surfaces of the support.

In a preferred embodiment, the above-mentioned associating devices comprise:

a radially inner surface, connected to said side surfaces of the support by means of respective second axially opposite connecting portions, and blocking devices adapted to maintain said annular body in position on said rim.

The radially inner surface is connected to the side surfaces by means of said second connecting portions, in a manner known per se, for instance by welding.

Even more preferably, the radially inner surface is integrally made with said side surfaces and said second connecting portions, forming a closed hollow annular body. In this way, it is advantageously possible to manufacture said annular body only in one production step, for instance by molding.

According to such preferred embodiment, the blocking devices preferably comprise a plurality of spring retaining members circumferentially distributed along said support, adapted to be inserted in respective blocking seats provided on the rim. Preferably, said spring retaining members are integrally formed with the above-mentioned radially inner surface and extend in the axial direction (with reference to the safety support mounted on the rim).

Preferably, the rigid and substantially non-extensible material is selected from the group comprising: steel, superelastic materials, aluminum alloys.

In the present description and in the appended claims, the term "superelastic materials" is used to indicate any material which, having undergone a strain, can recover its original shape once the strain has stopped.

Among the superelastic materials, metal alloys such as Cu—Zn—Al, Cu—Al—Ni, Ti—Ni and Cu—Zn are preferably employed.

Advantageously, the rigid materials of such type have an ultimate tensile strength and a yield strength such as to confer to the safety support of the invention an adequate centrifugation resistance, tested, for instance, by means of the above methodology.

Preferably, the ultimate tensile strength of the rigid materials employed to manufacture the annular body is comprised between 200 and 4500 N/mm$^2$ and, even more preferably, between 500 and 2000 N/mm$^2$, while the yield strength is preferably comprised between 100 and 3000 N/mm$^2$ and, more preferably, between 350 and 1500 N/mm$^2$.

The thickness of the annular body is preferably comprised between 0.2 and 4 mm and, even more preferably, between 0.4 and 2 mm.

According to a preferred embodiment, the distance between the plane tangent to the radially outer surface at the radially outermost point of said surface, and the intersection point between the tangent to one of the side surfaces at the axially outermost point of the side surface and the extension—beyond the profile of the annular body—of the radially outer surface is comprised between about 2% and about 40% of the maximum height of the annular body and, even more preferably, between about 5% and about 20% of the maximum height of the annular body.

Advantageously, when the above-mentioned geometric parameter falls within said range of values, a bending of the radially outer surface is ensured so as not to involve plastic (i.e. non-reversible) deformations of the annular body.

More precisely, thanks to such configuration of the radially outer surface of the annular body, it is advantageously possible to confer to the safety support of the invention an adequate elasticity in the radial direction, so that the behavior of the support, when the latter is in use as a consequence of the pressure loss of the tire, is that of a radially elastic body extended between the rim and the crown portion of the tire.

Preferably, the radially outer surface comprises a central portion extending astride the plane of symmetry of the annular body, said central portion having a bending radius preferably greater than 100 mm and, even more preferably, comprised between 500 and 1500 mm.

Preferably, the radially outer surface further comprises at least one couple of shoulder portions extending on sides axially opposite with respect to said central portion, i.e., with reference to one half of the annular body with respect to the plane of symmetry of the latter, said radially outer surface comprises at least one shoulder portion. Preferably, said at least one shoulder portion has a bending radius smaller than the bending radius of said central portion.

In this way, it is advantageously possible to distribute the radial strain of the safety support of the invention, preventing ensuing damaging local concentrations of the stresses.

If the annular body should have a plurality of shoulder portions extending on the same side of the radially outer surface with respect to the plane of symmetry of the annular body, preferably said shoulder portions have respective bending radii decreasing as the distance from the plane of symmetry of the annular body increases. Advantageously, also in this case, an adequate distribution of the radial strain undergone by the safety support of the invention is obtained.

Preferably, the above-mentioned first and second connecting portions have bending radii smaller than the bending radius of the central portion and than the bending radius of said shoulder portions and, even more preferably, the bending radii of the first and the second connecting portions are comprised between 5 and 30 mm.

Advantageously, such values of the bending radii of the first and second connecting portions allow to adjust the elasticity of the annular body, preventing ensuing damaging local concentrations of the stresses.

Preferably, the side surfaces have a bending radius greater than the radius of the first connecting portions and, even more preferably, comprised between 20 and 100 mm.

Similarly to what has been said for the bending radii of the first and the second connecting portions, such values of the bending radii of the side surfaces of the annular body advantageously allow to adjust the elasticity of the annular body, preventing ensuing damaging local concentrations of the stresses.

Preferably, the filling of expanded material has a compression strength comprised between 5 and 50 MPa and, even more preferably, comprised between 10 and 40 MPa, and a density comprised between 0.02 and 1 g/cm$^3$ and, even more preferably between 0.03 and 0.6 g/cm$^3$.

According to a preferred embodiment of the safety support of the invention, the elastically deformable expanded material includes a foam selected from the group comprising: polyurethane foams, isoprene-isobutadiene foams, polyvinylchloride foams, acrylonitrile-butadiene foams, ethylene-vinylacetate foams.

Advantageously, the use of such types of elastically deformable expanded materials allows to obtain an advantageous reduction in the weight of the safety support of the invention.

According to a preferred embodiment, the elastically deformable expanded material is a closed-cell foam, preferably a polyurethane foam, which permits to dissipate the deformation work essentially into heat, which causes the expansion of the gas trapped in the closed cells, with an ensuing further effective contrasting action of the deformation of the annular body.

In a second aspect thereof, the present invention relates to a safety system comprising a tire having a tread, a couple of sidewalls and a couple of bead wires incorporated into corresponding beads adapted to be mounted on respective rim housing seats, and a safety support as defined above.

In a third aspect thereof, the present invention relates to a vehicle wheel comprising a rim, a tire having a tread, a couple of sidewalls and a couple of beads mounted on respective rim housing seats, and a safety support as defined above supported by said rim in a cavity defined within said tire.

BRIEF DESCRIPTION OF THE DRAWINGS

Further characteristics and advantages of the invention will become more readily apparent from the following description of a preferred embodiment of a safety support according to the invention, made by way of non limiting indication, with reference to the attached drawings, wherein.

DETAILED DESCRIPTION OF THE EXEMPLARY EMBODIMENTS

Figure 1:
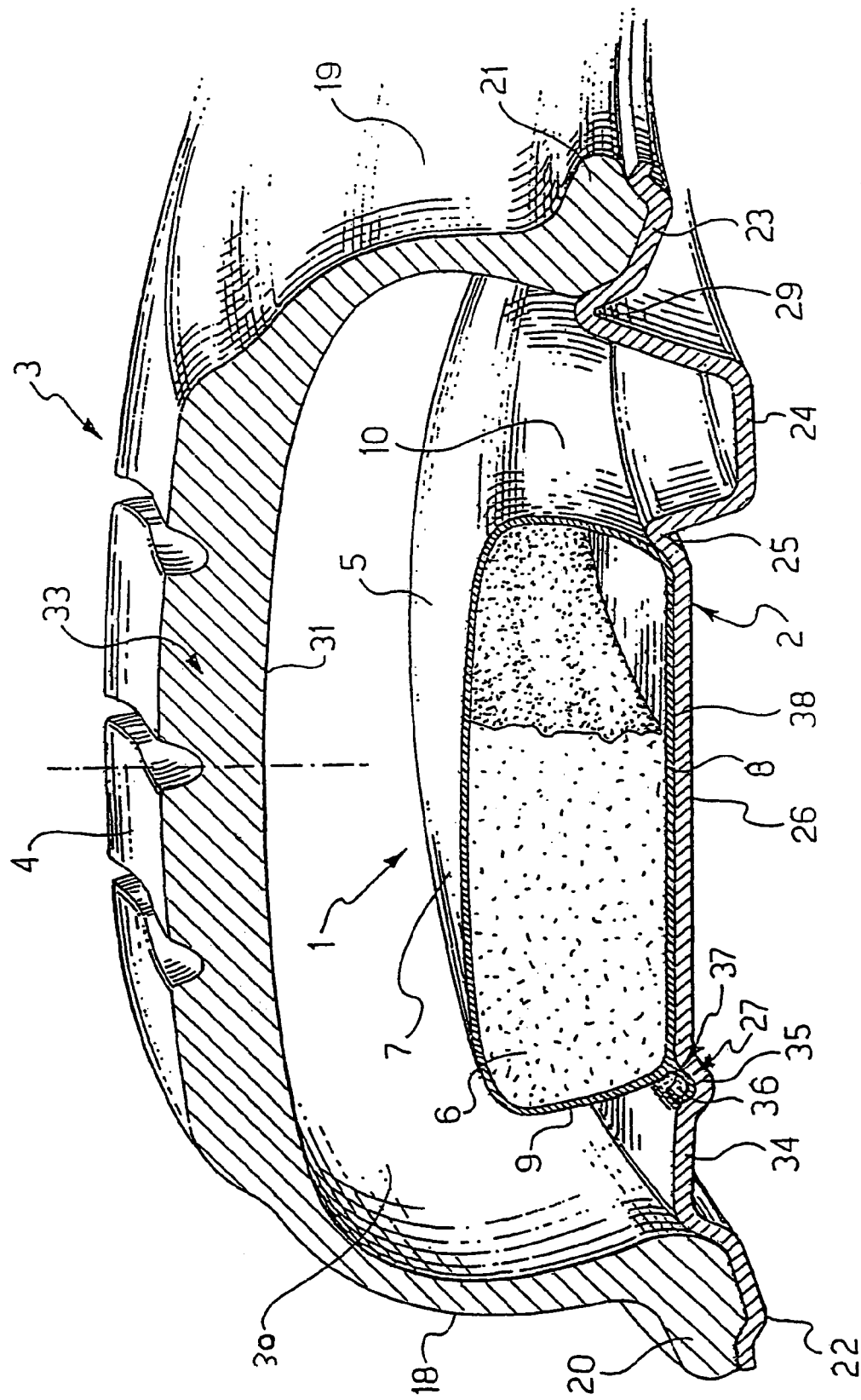
FIG. 1 shows a partial perspective view, in cross-section, of a first preferred embodiment of a safety support according to the invention, mounted on a rim within a vehicle tire.

With reference to FIG. 1, a first preferred embodiment of a safety support according to the invention is generally indicated at 1, which safety support is mounted on a rim 2 of the PAX® type within a cavity 30 of a vehicle tire 3. In the shown example the size of support 1 was of 135–420 (50), i.e. a support having a width L equal to 135 mm, a nominal fitting diameter equal to 420 mm and a height H equal to 50 mm, said height H being sized depending on the height of cavity 30 of the tire, in such a way as not to interfere with the running of the inflated tire 3, not even in case of temporary relevant overloads.

Even though in the embodiment of FIG. 1 a rim 2 and a tire 3 of the PAX® type are shown, i.e. shaped as to prevent the unwedging of the tire 3 in case of loss of inflation pressure, it is evident that the safety support 1 of the invention may also be applied to traditional rims.

Should the tire 3 partly or entirely loose the inflation pressure because of an accidental puncture, the safety support 1 supports a crown portion 33 of tire 3, said crown portion 33 comprising, in a manner conventionally per se, a tread 4 arranged as a crown around a belt structure in its turn arranged as a crown around a torically shaped carcass including an airproof liner 31 and a reinforcing ply (the belt structure, the carcass and the reinforcing ply are not shown in detail).

The tire 3 further comprises a couple of axially opposite sidewalls 18, 19 ending with respective beads 20, 21, for anchoring the tire to the rim 2. The beads 20 and 21 are inclined in opposite way with respect to the beads of a traditional tire. The tire 3 is associated to the rim 2 in a manner conventional per se, in particular by associating the beads 20, 21 to respective housing seats 22, 23 positioned at the axially opposite ends of the rim 2, known in the field by the name of rim flanges.

In the embodiment of FIG. 1, the rim 2 comprises, starting from the above-mentioned housing seat 23 and moving in the axial direction, a mounting groove 24, an axially inner blocking abutment 25, a first substantially flat cylindrical zone 26, a blocking seat 35 for blocking the safety support 1 on the rim 2 as described in the following of the present description, a second substantially flat cylindrical zone 34, and the already mentioned housing seat 22. In the embodiment shown in FIG. 1, the housing seat 23 is provided with a suitable axially inner abutment 29, known per se, adapted to prevent the bead 21 from unwedging.

According to the invention, the safety support 1 of the invention comprises a hollow annular body 5, preferably closed, having a substantially toroidal shape, made of a rigid and substantially non-extensible material, including a filling 6 made of elastically deformable expanded material, such as for example a polyurethane foam having preferably closed cells.

According to a preferred embodiment, the polyurethane foam has a compression strength comprised between 10 and 15 MPa, and a density comprised between 0.04 and 0.05 g/cm$^3$.

Preferably, the annular body 5 is made of spring steel, i.e. a steel having an ultimate tensile strength preferably comprised between 1400 and 1600 N/mm$^2$, and a yield strength preferably comprised between 1200 and 1300 N/mm$^2$.

In the example shown in FIG. 1, the thickness of the annular body 5 is equal to about 0.4 mm.

According to the invention, in an embodiment thereof, the safety support 1 includes a radially outer surface 7, two axially opposite side surfaces 9, 10 connected to the surface 7 by means of first connecting portions 11, 13, and associating devices 37 for associating the annular body 5 to the rim 2. In the embodiment of FIG. 1, the associating devices 37 comprise a radially inner surface 8, connected to the side surfaces 9, 10 by means of second connecting portions 12, 14, and blocking devices 27 adapted to maintain the annular body 5 in position on the rim 2. In the preferred embodiment shown in FIG. 1, said blocking devices 27 are intended for cooperating with the respective blocking seats 35 of the rim 2. More particularly, in the embodiment shown in FIG. 1, the blocking devices 27 comprise a plurality of spring retaining members 36 adapted to snap-fit in the respective blocking seats 35 of the rim 2. Such spring retaining members 36 are preferably made of the same material employed for manufacturing the annular body 5 of the safety support 1 and, even more preferably, are integrally made with the annular body 5.

At the radially inner surface 8, a hole is obtained (not shown), intended for the injection of the filler 6 of expanded material.

Preferably, the radially outer surface 7 and the radially inner surface 8 are integrally formed with said side surfaces 9, 10, to form a closed hollow annular body.

Preferably, the safety support 1 comprises an annular body 5 shaped in such a way that the distance F between the plan A tangent to the radially outer surface 7 at the radially outermost point of said surface 7 and the intersection point between the tangent T to one of the side surface 9, 10 at the axially outermost point of the side surface and the extension E of the radially outer surface 7 is comprised between about 2% and about 40% of the maximum height H of the annular body 5.

Advantageously, said preferred configuration of the safety support 1 allows to obtain a support which is able to elastically respond to the stresses due to the action exerted by the rolling surface on said support 1, guaranteeing at the same time a deformation such as to ensure an adequate contact surface between the safety support 1 and the crown portion 33 of the tire 3.

Even more preferably, said distance F is comprised between 5% and 20% of the maximum height H of the annular body 5.

Preferably, the radially outer surface 7 comprises a central portion 15 extending astride the plane of symmetry Π of the annular body 5. In the preferred embodiment shown in FIG. 2, the central portion 15 has a bending radius $R_c$ equal to about 850 mm.

Figure 2:
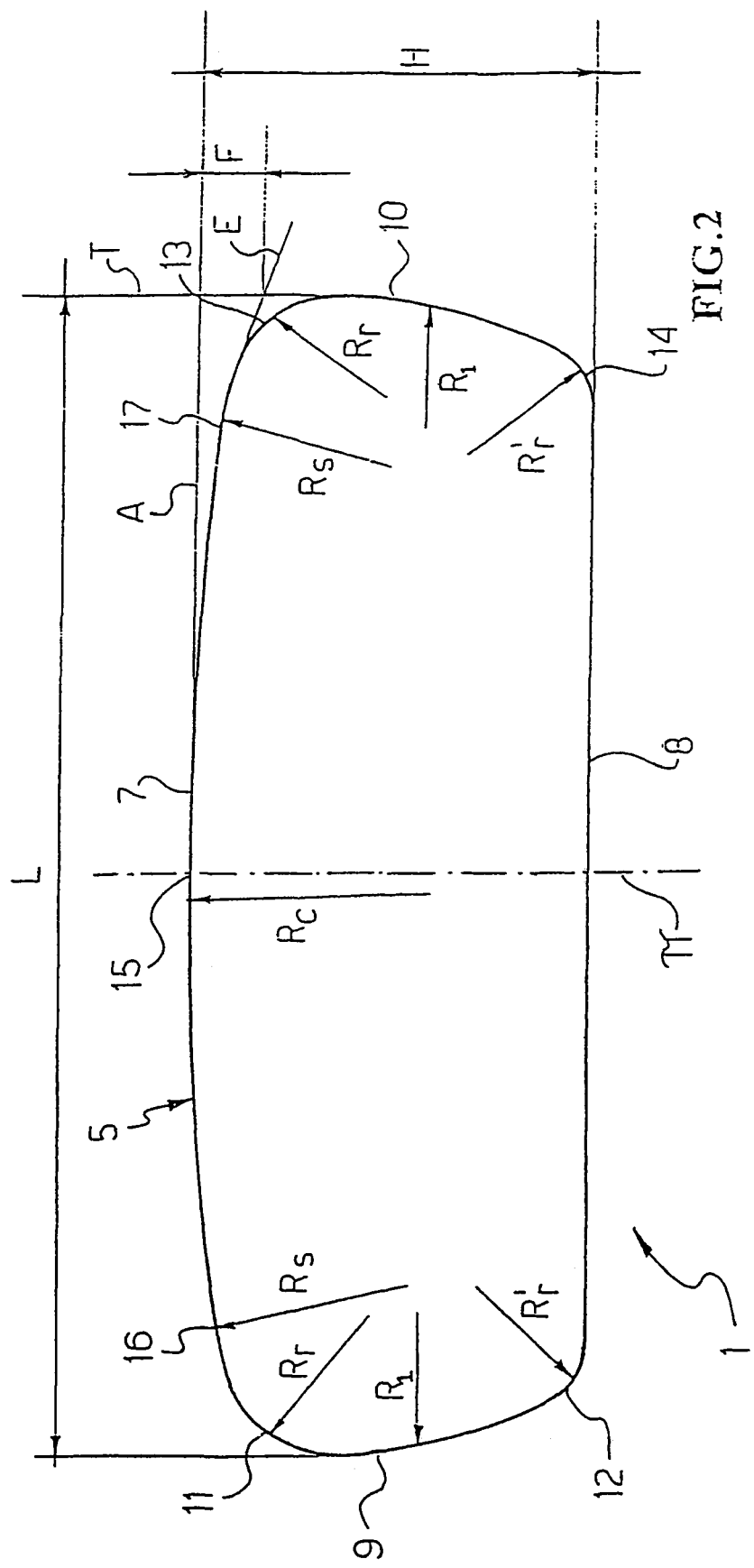
FIG. 2 shows a partial front view, in cross-section, of the safety support of FIG. 1.

As shown in FIG. 2, preferably, the radially outer surface 7 further comprises at least one couple of shoulder portions 16, 17, extending on axially opposite sides of the central portion 15. The shoulder portions 16, 17 have respective bending radii $R_s$, which are preferably equal to each other and equal to about 300 mm.

The first connecting portions 11, 13 and the second connecting portions 12, 14 have respectively bending radii $R_r$, $R'_r$, smaller than the bending radius $R_c$ of the central portion 15 and than the bending radius $R_s$ of the shoulder portions 16, 17.

Preferably, the bending radius $R_r$ of the first connecting portions 11, 13, is equal to about 12 mm, while the bending radius $R'_r$ of the second connecting portions is preferably equal to about 15 mm.

The side surfaces 9, 10 have a bending radius $R_l$ preferably comprised between 50 and 100 mm.

In the embodiment shown in FIGS. 1 and 2, the safety support 1 of the invention can support, in use, a maximum load of 590 kg, equal to about 80% of the maximum admissible load for the tire 3, and a weight more than halved with respect to the weight of the safety supports of the known art. Besides, the Applicant has found, by means of a laboratory test carried out by rotating the rim 2-safety support 1 assembly at a rotation speed corresponding to a supposable rolling speed of the vehicle in the order of 400 km/h, that the contact between the safety support 1 and the rim 2 is ensured in a stable manner. Besides, the integrity of the support 1 during centrifugation, again tested by means of a similar laboratory test carried out at a rotation speed corresponding to a running speed greater than 450 km/h, is also ensured.

Figure 3:
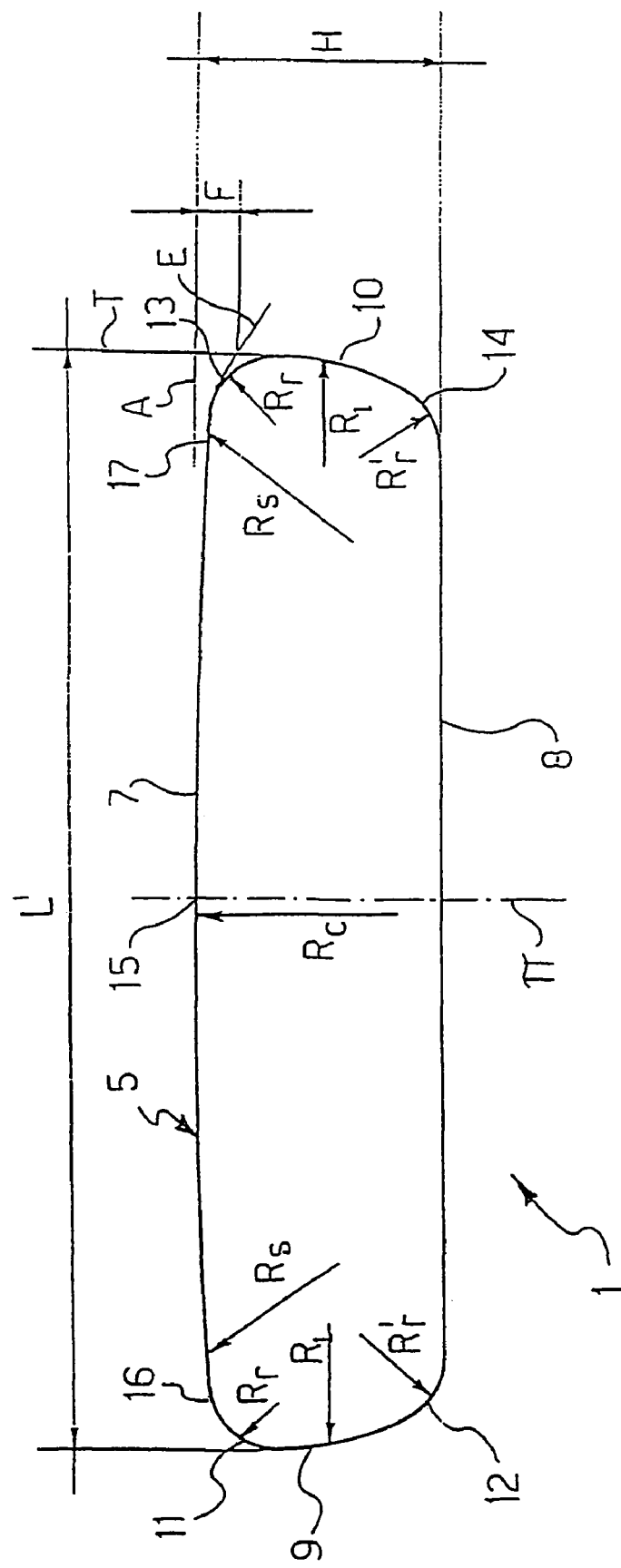
FIG. 3 shows a partial front view, in cross-section, of a second preferred embodiment of the safety support according to the invention.

FIG. 3 shows a second preferred embodiment of a safety support according to the invention having a size 140–480 (30), mounted on a rim within a cavity of a vehicle tire.

In other words, in the preferred embodiment shown in FIG. 3, the safety support 1 of the invention has a width L equal to 140 mm, a nominal fitting diameter of 480 mm and a height H of 30 mm, said height H being sized in such a way as not to interfere with the running of the inflated tire 3. In the following description and in said figure, the elements of the safety support 1 structurally or functionally equivalent to those already illustrated with respect to FIGS. 1–2 are indicated at the same reference signs and will not be further described.

The annular body 5 shown in FIG. 3 is made of pipe steel, i.e. a steel having an ultimate tensile strength smaller than the ultimate tensile strength of the above spring steel, preferably comprised between 500 and 600 N/mm$^2$, and a yield strength smaller than the yield strength of the above spring steel, preferably comprised between 300 and 350 N/mm$^2$.

The thickness of the annular body 5 is preferably equal to about 0.4 mm.

According to the invention, the safety support 1 includes a filling made of elastically deformable expanded material, such as for example a closed cell polyurethane foam, not shown in FIG. 3. Preferably, the polyurethane foam has a compression strength comprised between 25 and 30 MPa and a density comprised between 0.10 and 0.12 g/cm$^3$.

Preferably, the distance F between the plane A tangent to the radially outer surface 7 at the radially outermost point of said surface 7 and the intersection point between the tangent T to one of the side surfaces 9, 10 at the axially outermost point of the side surface and the extension E of the radially outer surface 7 is comprised between about 2% and about 40% and, even more preferably, between 5% and 20% of the maximum height H of the annular body 5.

In the preferred embodiment shown in FIG. 3, the central portion 15 has a bending radius R$_c$ of about 1500 mm.

In the embodiment shown in FIG. 3, the bending radii R$_s$ of the shoulder portions 16, 17 are equal to each other and equal to about 700 mm.

Preferably, the bending radius R$_r$ of the first connecting portions 11, 13 is comprised between 6 and 10 mm and, even more preferably, is equal to about 8 mm.

The bending radius R'$_r$ of the second connecting portions 12, 14 is preferably comprised between 6 and 10 mm and, even more preferably, is equal to about 8 mm.

The side surfaces 9, 10 have a bending radius R$_l$ preferably comprised between 20 and 40 mm.

In the embodiment shown in FIG. 3, the safety support 1 of the invention can support—in use—a maximum load of 570 kg, equal to about 80% of the maximum load admissible for the tire, and a weight more than halved with respect to the weight of the safety supports of the prior art.

The safety support 1 of the invention, which may be made by molding or extrusion depending on the type of material selected, may be integrally produced or, in alternative, may be made in two pieces, successively assembled in a manner known per se, for example by welding along seam lines preferably positioned in the radially inner surface 8 of the safety support 1. The filling 6 is injected through the above-mentioned filling hole—not shown—preferably provided at the radially inner surface 8 of the support 1.

As concerns the assembly operation on the rim 2 of the safety support 1 of the invention in the embodiment of FIG. 1, said operation is carried out as follows. In a first step, the safety support 1 is introduced in the cavity 30 of the tire 3. In a second step, the bead 21 of the tire 3, containing therein the support 1, is moved past the abutment 29 of the rim 2 and inserted in the respective housing seat 23. In a third step, the radially inner surface 8 of the safety support 1 is associated to the first substantially flat cylindrical zone 26 of the rim 2, positioning the side surface 10 of the support 1 against the blocking abutment 25 of the rim 2. In a fourth step, the spring retaining members 36 are inserted in the respective blocking seats 35, completing the positioning of the support 1 on the rim 2. In a fifth step, the bead 20 is positioned in the respective housing seat 22 of the rim 2.

In order to minimize the friction between the safety support 1 and tire 3, in the tire cavity 30 a lubricant is preferably included in a known manner for lubricating the contact between the radially outer surface 7 of the safety support 1 and the liner 31 of the tire 3, should said tire be subjected to a pressure loss.

As has already been recalled, the illustrated safety support 1 relates to a PAX® system. However, the safety support of the invention may also relate to a traditional system and may be mounted on a conventional two-piece rim provided with a flat bottom or on other types of commercially available rims, such as for example those with a detachable rim flange.

The invention claimed is:

1. A safety support for mounting on a rim of a vehicle wheel within a tire, comprising:
    a substantially toroidal hollow annular body; and
    a filling of elastically deformable expanded material;
    wherein the annular body comprises:
        a convex radially outer surface;
        two axially opposite side surfaces; and
        devices for associating the annular body to the rim;
    wherein the annular body is made of a substantially rigid and substantially non-extensible material,
    wherein the annular body is radially elastically deformable under load for absorbing stresses imparted to the tire in case of pressure loss by the tire, and
    wherein each side surface is connected to the radially outer surface by respective first axially opposite connecting portions.

2. The safety support of claim 1, wherein the associating devices comprise blocking devices adapted to maintain the annular body in position on the rim.

3. The safety support of claim 2, wherein the blocking devices are integrally formed with the side surfaces.

4. The safety support of claim 2, wherein the associating devices further comprise a radially inner surface connected to the side surfaces by respective second axially opposite connecting portions.

5. The safety support of claim 4, wherein the radially inner surface is integrally formed with the side surfaces and the respective second axially opposite connecting portions.

6. The safety support of claim 2 or 4, wherein the blocking devices comprise a plurality of spring retaining members adapted to be inserted in blocking seats of the rim.

7. The safety support of claim 1, wherein the substantially rigid and substantially non-extensible material is selected from the group comprising:
  steel;
  super-elastic materials; and
  aluminum alloys.

8. The safety support of claim 1, wherein a distance between:
  a plane tangent to the radially outer surface at a radially outermost point of the radially outer surface, and
  an intersection point between a tangent to one of the side surfaces at an axially outermost point of the respective side surface and an extension of the radially outer surface,
  is greater than or equal to about 2% of a maximum height of the annular body and less than or equal to about 40% of the maximum height of the annular body.

9. The safety support of claim 1, wherein the radially outer surface comprises a central portion extending on both sides of a plane of symmetry of the annular body.

10. The safety support of claim 9, wherein the radially outer surface further comprises at least one pair of shoulder portions extending on axially opposite sides of the central portion.

11. The safety support of claim 10, wherein the central portion comprises a bending radius greater than a bending radius of the shoulder portions.

12. The safety support of claim 10, wherein the shoulder portions extending on a same side of the radially outer surface with respect to the plane of symmetry comprise respective bending radii decreasing as a distance of the annular body from the plane of symmetry increases.

13. The safety support of claim 9, wherein the first axially opposite connecting portions comprise connecting radii smaller than a bending radius of the central portion.

14. The safety support of claim 10, wherein the first axially opposite connecting portions comprise connecting radii smaller than a bending radius of the shoulder portions.

15. The safety support of claim 9, wherein the associating devices comprise a radially inner surface connected to the side surfaces by respective second axially opposite connecting portions, and
  wherein the second axially opposite connecting portions comprise connecting radii smaller than a bending radius of the central portion.

16. The safety support of claim 10, wherein the associating devices comprise a radially inner surface connected to the side surfaces by respective second axially opposite connecting portions, and
  wherein the second axially opposite connecting portions comprise connecting radii smaller than a bending radius of the shoulder portions.

17. The safety support of claim 1, wherein the side surfaces comprise a bending radius greater than or equal to 20 mm and less than or equal to 100 mm.

18. The safety support of claim 1, wherein the elastically deformable expanded material includes a foam selected from the group comprising:
  polyurethane foams;
  isoprene-isobutadiene foams;
  polyvinylchloride foams;
  acrylonitrile-butadiene foams; and
  ethylene-vinylacetate foams.

19. A safety system for a vehicle wheel, comprising:
  a tire; and
  a safety support;
  wherein the tire comprises:
    a tread;
    a pair of sidewalls; and
    a pair of beads for mounting the tire on respective housing seats of a rim of the vehicle wheel;
  wherein the safety support comprises:
    a substantially toroidal hollow annular body; and
    a filling of elastically deformable expanded material;
  wherein the annular body comprises:
    a convex radially outer surface;
    two axially opposite side surfaces; and
    devices for associating the annular body to the rim;
  wherein the annular body is made of a substantially rigid and substantially non-extensible material,
  wherein the annular body is radially elastically deformable under load for absorbing stresses imparted to the tire in case of pressure loss by the tire, and
  wherein each side surface is connected to the radially outer surface by respective first axially opposite connecting portions.

20. A vehicle wheel, comprising:
  a tire;
  a safety support; and
  a rim;
  wherein the tire comprises:
    a tread;
    a pair of sidewalls; and
    a pair of beads for mounting the tire on respective housing seats of the rim;
  wherein the safety support comprises:
    a substantially toroidal hollow annular body; and
    filling of elastically deformable expanded material;
  wherein the annular body comprises:
    a convex radially outer surface;
    two axially opposite side surfaces; and
    devices for associating the annular body to the rim;
  wherein the annular body is made of a substantially rigid and substantially non-extensible material,
  wherein the annular body is radially elastically deformable under load for absorbing stresses imparted to the tire in case of pressure loss by the tire, and
  wherein each side surface is connected to the radially outer surface by respective first axially opposite connecting portions.

21. A safety support for mounting on a rim of a vehicle wheel within a tire, comprising:
  a substantially toroidal hollow annular body; and
  a filling of elastically deformable expanded material;
  wherein the annular body comprises:
    a convex radially outer surface;
    two axially opposite side surfaces; and
    devices for associating the annular body to the rim;
  wherein the annular body substantially resists radial expansion due to centrifugal forces,
  wherein the annular body acts as a spring for absorbing stresses imparted to the tire in case of pressure loss by the tire, and
  wherein each side surface is connected to the radially outer surface by respective first axially opposite connecting portions.

22. The safety support of claim 21, wherein the associating devices comprise blocking devices adapted to maintain the annular body in position on the rim.

23. The safety support of claim 22, wherein the blocking devices are integrally formed with the side surfaces.

24. The safety support of claim 22, wherein the associating devices further comprise a radially inner surface connected to the side surfaces by respective second axially opposite connecting portions.

25. The safety support of claim 24, wherein the radially inner surface is integrally formed with the side surfaces and the respective second axially opposite connecting portions.

26. The safety support of claim 22 or 24, wherein the blocking devices comprise a plurality of spring retaining members adapted to be inserted in blocking seats of the rim.

27. The safety support of claim 21, wherein the annular body is made of a material selected from the group comprising:
   steel;
   super-elastic materials; and
   aluminum alloys.

28. The safety support of claim 21, wherein a distance between:
   a plane tangent to the radially outer surface at a radially outermost point of the radially outer surface, and
   an intersection point between a tangent to one of the side surfaces at an axially outermost point of the respective side surface and an extension of the radially outer surface,
   is greater than or equal to about 2% of a maximum height of the annular body and less than or equal to about 40% of the maximum height of the annular body.

29. The safety support of claim 21, wherein the radially outer surface comprises a central portion extending on both sides of a plane of symmetry of the annular body.

30. The safety support of claim 29, wherein the radially outer surface further comprises at least one pair of shoulder portions extending on axially opposite sides of the central portion.

31. The safety support of claim 30, wherein the central portion comprises a bending radius greater than a bending radius of the shoulder portions.

32. The safety support of claim 30, wherein the shoulder portions extending on a same side of the radially outer surface with respect to the plane of symmetry comprise respective bending radii decreasing as a distance of the annular body from the plane of symmetry increases.

33. The safety support of claim 29, wherein the first axially opposite connecting portions comprise connecting radii smaller than a bending radius of the central portion.

34. The safety support of claim 30, wherein the first axially opposite connecting portions comprise connecting radii smaller than a bending radius of the shoulder portions.

35. The safety support of claim 29, wherein the associating devices comprise a radially inner surface connected to the side surfaces by respective second axially opposite connecting portions, and
   wherein the second axially opposite connecting portions comprise connecting radii smaller than a bending radius of the central portion.

36. The safety support of claim 30, wherein the associating devices comprise a radially inner surface connected to the side surfaces by respective second axially opposite connecting portions, and
   wherein the second axially opposite connecting portions comprise connecting radii smaller than a bending radius of the shoulder portions.

37. The safety support of claim 21, wherein the side surfaces comprise a bending radius greater than or equal to 20 mm and less than or equal to 100 mm.

38. The safety support of claim 21, wherein the elastically deformable expanded material includes a foam selected from the group comprising:
   polyurethane foams;
   isoprene-isobutadiene foams;
   polyvinylchloride foams;
   acrylonitrile-butadiene foams; and
   ethylene-vinylacetate foams.

39. A safety system for a vehicle wheel, comprising:
   a tire; and
   a safety support;
   wherein the tire comprises:
      a tread;
      a pair of sidewalls; and
      a pair of beads for mounting the tire on respective housing seats of a rim of the vehicle wheel;
   wherein the safety support comprises:
      a substantially toroidal hollow annular body; and
      a filling of elastically deformable expanded material;
   wherein the annular body comprises:
      a convex radially outer surface;
      two axially opposite side surfaces; and
      devices for associating the annular body to the rim;
   wherein the annular body substantially resists radial expansion due to centrifugal forces,
   wherein the annular body acts as a spring for absorbing stresses imparted to the tire in case of pressure loss by the tire, and
   wherein each side surface is connected to the radially outer surface by respective first axially opposite connecting portions.

40. A vehicle wheel, comprising:
   a tire;
   a safety support; and
   a rim;
   wherein the tire comprises:
      a tread;
      a pair of sidewalls; and
      a pair of beads for mounting the tire on respective housing seats of the rim;
   wherein the safety support comprises:
      a substantially toroidal hollow annular body; and
      a filling of elastically deformable expanded material;
   wherein the annular body comprises:
      a convex radially outer surface;
      two axially opposite side surfaces; and
      devices for associating the annular body to the rim;
   wherein the annular body substantially resists radial expansion due to centrifugal forces,
   wherein the annular body acts as a spring for absorbing stresses imparted to the tire in case of pressure loss by the tire, and
   wherein each side surface is connected to the radially outer surface by respective first axially opposite connecting portions.

* * * * *